(12) United States Patent
Kotliar

(10) Patent No.: US 6,557,374 B2
(45) Date of Patent: May 6, 2003

(54) TUNNEL FIRE SUPPRESSION SYSTEM AND METHODS FOR SELECTIVE DELIVERY OF BREATHABLE FIRE SUPPRESSANT DIRECTLY TO FIRE SITE

(76) Inventor: Igor K. Kotliar, P.O. Box 2021, New York, NY (US) 10159-2021

( * ) Notice: Subject to any disclaimer, the term of this patent is extended or adjusted under 35 U.S.C. 154(b) by 0 days.

(21) Appl. No.: 10/078,988

(22) Filed: Feb. 19, 2002

(65) Prior Publication Data

US 2002/0088250 A1 Jul. 11, 2002

Related U.S. Application Data

(63) Continuation-in-part of application No. 10/024,079, filed on Dec. 17, 2001, and a continuation-in-part of application No. 09/975,215, filed on Oct. 10, 2001, now Pat. No. 6,502,421, and a continuation-in-part of application No. 09/854,108, filed on May 11, 2001, now Pat. No. 6,401,487, and a continuation-in-part of application No. 09/750,801, filed on Dec. 28, 2000, now Pat. No. 6,418,752.

(51) Int. Cl.[7] .................................................. F25J 1/00
(52) U.S. Cl. .............................. 62/640; 62/78; 62/260; 169/45; 169/64; 454/166; 454/167
(58) Field of Search ........................... 62/640, 78, 260; 169/45, 64; 454/166, 167

(56) References Cited

U.S. PATENT DOCUMENTS

| | | | |
|---|---|---|---|
| 4,896,514 A | * | 1/1990 | Sugiyama et al. ............. 62/78 |
| 5,063,753 A | * | 11/1991 | Woodruff ........................ 62/78 |
| 5,388,413 A | * | 2/1995 | Major et al. ................... 62/911 |
| 5,472,480 A | * | 12/1995 | Barbe ............................. 95/54 |
| 5,649,995 A | * | 7/1997 | Gast, Jr. ......................... 95/54 |
| 5,779,495 A | * | 7/1998 | Dechelette et al. |
| 5,799,652 A | * | 9/1998 | Kotliar ................... 128/205.11 |
| 5,921,091 A | * | 7/1999 | Foss et al. .................... 62/46.1 |
| 6,012,533 A | * | 1/2000 | Cramer ......................... 169/45 |

* cited by examiner

Primary Examiner—Ronald Capossela
(74) Attorney, Agent, or Firm—FirePASS Corp.

(57) ABSTRACT

A total flood fire suppression system is provided for transportation tunnels and other human-occupied environments, which employs a selective gas delivery method for supplying a breathable fire-extinguishing agent to a location closest to a fire site. The agent is produced from ambient air at site and stored in high-pressure containers communicating with an addressed gas delivery hose installed throughout a tunnel. When fire is detected, the agent is released from storage containers into the gas delivery hose that simultaneously becomes penetrated or broken in a location next to the fire site, allowing releasing the agent there and extinguishing the fire by totally flooding the affected portion of a tunnel. Additionally, the direction of the agent flow can be controlled by air blocks or inflatable tunnel plugs that, via a signal from a central control station, can inflate and block a tunnel tube in order to redirect the agent flow into the opposite to a block direction.

17 Claims, 11 Drawing Sheets

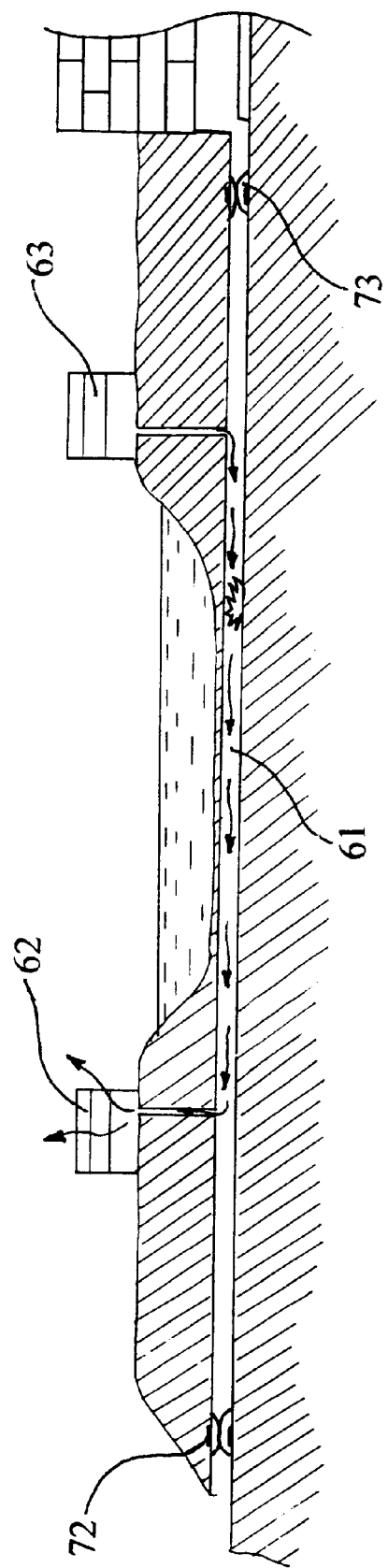

TUNNEL FIRE SUPPRESSION SYSTEM AND METHODS FOR SELECTIVE DELIVERY OF BREATHABLE FIRE SUPPRESSANT DIRECTLY TO FIRE SITE

This application is a continuation in part of:

U.S. Ser. No. 09/750,801 "Hypoxic Fire Prevention and Fire Suppression Systems and Breathable Fire Extinguishing Compositions for Human Occupied Environments" filed Dec. 28, 2000, now U.S. Pat. No. 6,418,752.

U.S. Ser. No. 09/854,108 "Hypoxic Fire Prevention and Fire Suppression Systems with Breathable Fire Extinguishing Compositions for Human Occupied Environments" filed May 11, 2001 now U.S. Pat. No. 6,401,487 and U.S. Ser. No. 09/975,215 "Mobile Firefighting Systems with Breathable Hypoxic Fire Extinguishing Compositions for Human Occupied Environments" filed Oct. 10, 2001 now U.S. Pat. 6,502,421 and U.S. Ser. No. 10/024,079 "Hyperbaric Hypoxic Fire Escape and Suppression Systems for multilevel buildings, transportation tunnels and other human-occupied environments" filed Dec. 17, 2001.

FIELD OF THE INVENTION

The present invention introduces a fire suppression system for transportation tunnels and mines and methods of selective delivery of breathable fire-suppressive composition directly to the location affected by fire. The invented system is mostly suitable for installation in existing automobile and railroad tunnels without interruption of traffic. The system is also suited to provide complete fire safety in mines and other underground facilities, multilevel parking garages, industrial complexes, office and apartment buildings, schools, hospitals, shopping and entertainment centers and other enclosed compartments and environments.

This invention is an important addition and improvement of the Fire Prevention and Suppression Systems (FirePASS™) described in earlier patent applications provided above.

DESCRIPTION OF PRIOR ART

Tunnel fires have been usually divided into three types based on their order-of-magnitude rate of energy output. They are: small automobile fires (1 MW); medium fires (10 MW); and major and catastrophic fires (100 MW and higher). Small automobile fires are routine incidents, occurring as frequently as weekly in congested urban tunnels. Such reported fires have been universally extinguished without difficulty to date.

However, the catastrophic fire following a suicidal terrorist attack in a congested traffic tunnel remains to be the most critical scenario, for which emergency services and authorities are unequipped and unprepared. It is relatively uncomplicated to organize and carry out such attack. For instance a regular track can be used, loaded with flammable liquid canisters or pressurized propane gas containers. Such an attack can cause a significant initial structural damage with a consequent catastrophic fire and numerous fatalities.

Devastating tunnel fires demonstrate that their consequences depend entirely on the tunnel ventilation. Due to the necessity of providing adequate ventilation, a fire in a queue in an urban tunnel with a mixed fire load of passenger cars, buses and trucks could easily develop into catastrophe. Fire services will not be able to tackle these fires until it is too late, because radiant heat and smoke production is too great. This was the case in the last tunnel fire (October 2001, St-Gotthard tunnel), when firefighters could not even enter the tunnel until combustible materials were consumed by fire. Enhanced ventilation can also develop as a result of the chimney effect, as in the London Subway Fire and in the Kaprun disaster.

Current fire-preventative and fire-suppressive methods are totally insufficient in dealing with catastrophic tunnel fires. Several systems, either installed or contemplated—aside from their effectiveness during normal operations—show little capability of satisfactory operation during a catastrophic fire emergency. These are fire extinguishers, stand pipes, and sprinklers (including water mist sprinklers) with their ancillary systems of water supply and drainage, and different types of ventilation. The standard safety-supporting systems (communication, ventilation, lighting, and escape), primarily support the comfort and well-being of persons in a tunnel during normal operations, but their functions during catastrophic events are insufficient, as was revealed in the Channel Tunnel fire in 1996.

Automatic fire suppression systems based on water mist may be of little benefit in preventing structural damage to a tunnel and will not be effective in reducing loss of life in the event of a terrorist act followed by a catastrophic tunnel fire. The fire will probably be fully developed before the suppression system would be activated. The explosion can damage the water pipe system before it can create sufficient pressure for sprinklers. There will be a time lag between fire ignition and the activation of the water suppression system, which, in cold climates, must be initially dry. It will take time until pumps are started, valves are opened, and the delivery system piping is filled with water. Vehicular tunnel conditions cannot exploit sprinkler or water mist system strengths and turn most of them to a disadvantage. Tunnels are very long and narrow, often sloped laterally and longitudinally, vigorously ventilated, and never subdivided, so heat will normally not be localized over a fire. A catastrophic, hazardous-material fire will grow and spread hot combustion products far from its origin before sprinkler heads open, especially in colder regions where the water-suppression system is by necessity a dry one.

An inordinately large flow of water would be required to deliver an effective spray through all the potentially-open heads to assure application upon the fire itself. Besides that, since the fires usually originate from the lower part of a vehicle there will be no efficient fire suppression from sprinklers placed on the ceiling or walls of a tunnel.

Automatic activation of the sprinklers by active detectors would of necessity be delayed until all traffic could be halted, since even light spray would catch drivers unaware, and would dangerously slicken the roadway. Water squirting from the ceiling of a subaqueous tunnel would suggest tunnel failure and induce panic in motorists. Inadvertent activation is clearly unacceptable. Moreover, discharging water onto a fully developed catastrophic fire within an enclosed tunnel may only increase the danger to the tunnel occupants because of the steam generated when water contacts the fire.

Available publications and statistical data clearly indicate that currently no adequate and reliable fire-preventative and fire-suppressing technology for traffic tunnels is available anywhere in the world.

The new fire-safety technology, FirePASS™ (Fire Prevention And Suppression System), recently developed by the inventor and described in previous patent applications provided above, can help resolve the complex problem of fire safety in transportation tunnels, as well as in normally occupied facilities in general. FirePASS™ can minimize structural damage and fatalities in terrorist attacks. This system is effective in the prevention and instant extinguishing of fire of any possible origin and size. It is also absolutely safe for people and is user-friendly, while completely excluding any damage of equipment and property.

The system can be referred as related to Total Flood Clean Agent Systems, but it has significant differences from them. The FirePASS™ works by creating a safe human-breathable atmosphere in which nothing can be ignited or burn. This technology employs the Normobaric Breathable Hypoxic Air (NBHA) for prevention and suppression of fire.

FirePASS technology for tunnels is based on two properties that differentiate it from all other total flood clean agent systems:

1. The hypoxic generator produces oxygen-reduced air with a preset fire-suppressive, but safe for human breathing, concentration of oxygen. This eliminates the necessity of oxygen monitoring to control the tunnel atmosphere within the range of preset parameters. It also eliminates the complicated and vulnerable electronic feedback circuits that are sensible to structural and fire-related damage.
2. When in use, the protected space is constantly ventilated with fire-suppressive, breathable hypoxic air. This creates normal or even improved hygienic conditions for occupants of the tunnel while the hypoxic generator produces HEPA-filtered, normal-humidity air. Constant ventilation allows the prompt evacuation of toxic combustion gases without feeding fire with oxygen, which is not possible by any prior art systems.

As a fire-preventive modality, the environment of normobaric breathable hypoxic air in normally occupied facilities, including railroad tunnels, entirely eliminates the possibility of ignition of all common inflammable materials. As a fire-extinguishing option the effluent discharge of breathable hypoxic air would eliminate fire of any size and origin in seconds, while simultaneously evacuating toxic combustion gases and providing people with fresh breathable air. Smoke evacuation in this way does not feed the fire with oxygen, as in the case of usual forced ventilation with fresh atmospheric air.

The system can be activated by detection and control equipment for automatic system operation along with providing local and remote manual operation as needed. The system can be engineered for preventive or suppressive mode, as well as a combination of both.

FirePASS™ satisfies all critically important properties required for tunnel fire suppression, such as:
fire suppression efficiency;
reignition quenching;
electrical non-conductivity;
non-corrosivity to metals;
polymeric materials compatibility;
stability under long-term storage;
toxicity of the chemical and its combustion and decomposition products;
speed of dispersion; and
safety and occupational health requirements.

In its suppressive mode FirePASS™ for tunnels requires sufficient amount of the breathable agent stored in high pressure containers. However, after initial discharge from containers, the agent continues to be produced from ambient air by hypoxic generators and delivered to the site of a fire for as long as needed. The system can be operated by the tunnel operator within established criteria or on the instruction of the Fire Services Incident Operator. A single car fire with no traffic congestion may not warrant its operation. A fully involved or developing car fire resulted from an accident or terror act and spreading to other vehicles may require its activation.

A hypoxic agent can be used also as a fire-preventive modality in the railroad and funicular tunnels. This application of FirePASS™ technology can be achieved with the help of semi-airtight doors that turn the inner volume of a tunnel into an enclosure, having the atmosphere of NBHA inside. The doors will be opened automatically at the approach of train and closed again after it has passed through. The necessary amount of NBHA in the tunnel will be maintained by continuous compensatory discharge from piping.

The tunnel-specific configuration of FirePASS™ provides high reliability and efficiency. The system operational reliability cannot be affected by electric power supply failure, because it relies on built-in autonomic compressors and a backup power supply. After the initial agent discharge from pressurized containers the hypoxic generators would be automatically started and will produce sufficient amount of the agent for tunnel ventilation. Due to the addressed delivery of the agent via gas delivery hose the loss of agent is minimized.

The system is also resistant to structural damage. Thus, even in the case of a major explosion in the tunnel, causing damage to the gas delivery hose and communication cables, the fire-affected area of a tunnel can be flooded and further ventilated with the breathable hypoxic agent.

An important advantage of the FirePASS™ technology in comparison to all other existing fire-suppressive systems is that its fire-preventative and suppressive agent is produced at site by hypoxic air generators that consume nothing but electric energy. There are no gas transportation and refilling problems, and a low maintenance costs and simple integration in existing structural configurations are the obvious advantages of this technology.

The equipment for FirePASS™ technology exists in a variety of different prototypes, and can be manufactured and installed in specified applications both for newly-planned tunnels and for retrofitting-existing ones. The system can be periodically tested and exercised, it allows quick response and permits the tunnel operator positive control in the event of a fire. Approximate cost benefit analyses shows that the cost of the system is significantly less than the expected costs of damages, liability, and loss of a vital transportation link that may result from a single catastrophic fire.

SUMMARY OF THE INVENTION

The principal objects of this invention are as follows:
A method for producing and selectively delivering a breathable fire-suppressive hypoxic composition inside a part of a tunnel or other human-occupied environment affected by fire.
A method of extinguishing an ongoing fire in a tunnel by releasing a pressurized fire-extinguishing hypoxic composition into a location where fire is detected. This rapidly replaces the contaminated normoxic atmosphere in such an environment with the human-breathable hypoxic fire-extinguishing atmosphere and suppressing any fire at once.
The provision of equipment that can produce, store and deliver the breathable hypoxic fire-extinguishing composition.

The provision of a fire suppressant delivery system consisting of an expandable gas delivery hose, fire detectors installed at intervals along the hose's length and puncturing devices that can puncture the hose in any location where a fire is detected. This will allow the discharge of the fire suppressant from pressurized storage containers and flooding the portion of a tunnel affected by fire. Additional supply of hypoxic agent from hypoxic generators will maintain a fire-extinguishing atmosphere for as long as needed.

The provision of an inflatable tunnel-blocking device or plug that allows redirecting the fire-suppressant flow towards a direction opposite to the inflated plug.

BRIEF DESCRIPTION OF THE DRAWINGS

FIG. 11 illustrates an alternative method wherein both plugs are closed.

DESCRIPTION OF THE INVENTION

This invention is based on the Phenomenon of Ignition Suppression and Combustion Elimination in hypoxic breathable air and the Hypoxic Fire Prevention and Suppression System (FirePASS™), being described in previous patent applications.

Figure 1:
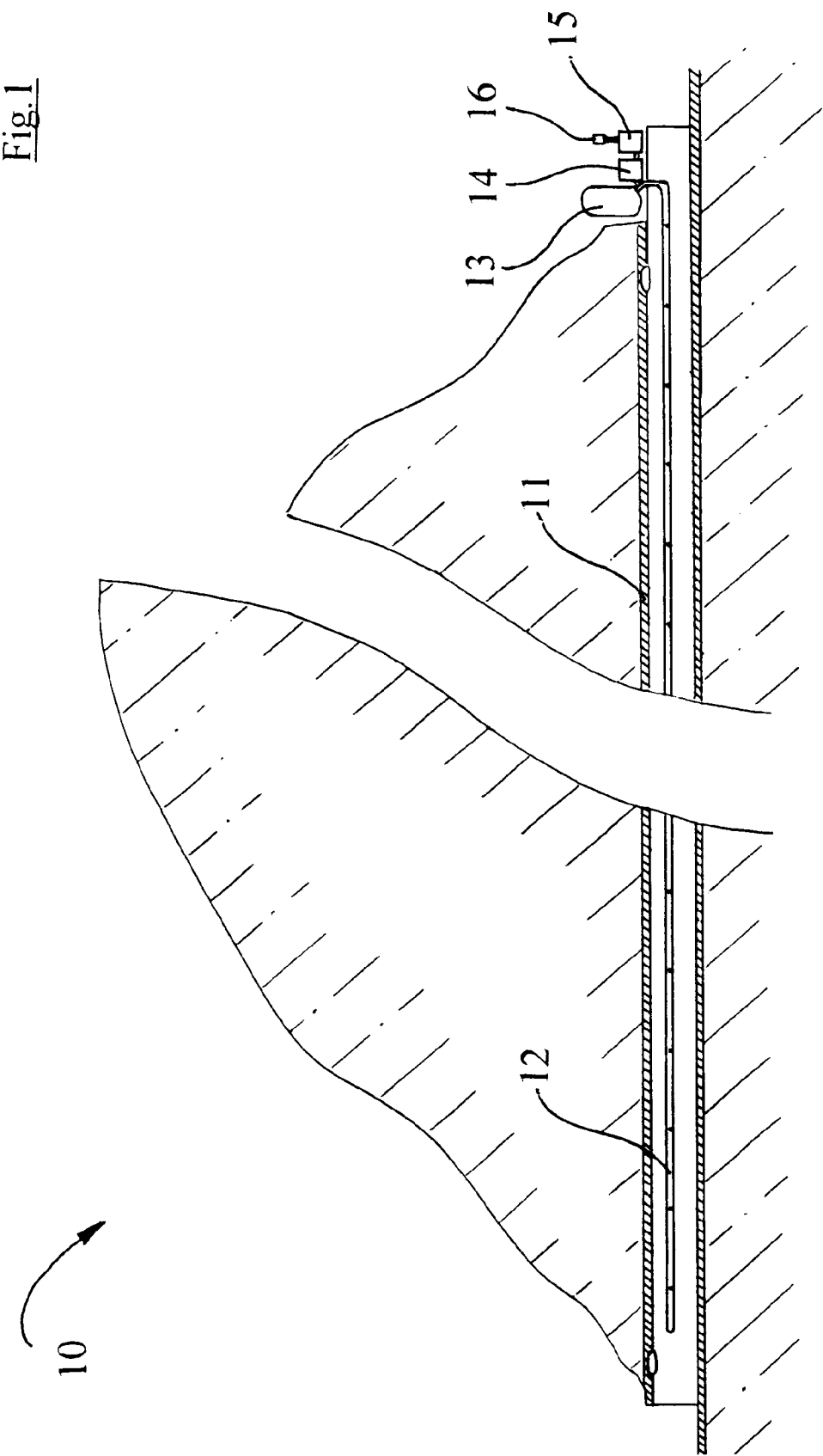
FIG. 1 presents a schematic view of the first preferred embodiment of the Hypoxic Tunnel Fire Suppression System.

FIG. 1 presents a schematic view of the first preferred embodiment 10 of the Hypoxic Tunnel Fire Suppression System (HTFSS) that is most suitable for automobile and railroad tunnels, mines and underground facilities. The system can be also used in different types of buildings, especially of expanded shape, like the Pentagon building near Washington D.C., having many miles of corridors and underground passageways.

A tunnel 11 having a gas-distribution hose 12 for selective delivery of hypoxic fire suppressant to any part of the tunnel 11. Hose 12 is connected, via a release valve, to a gas storage container 13 holding the fire-suppressive composition under high pressure and communicating with a high-pressure compressor 14 and hypoxic generator station 15.

When needed, the hypoxic generator station 15 intakes ambient atmospheric air through filter 16 and sends it in compressed form into an air-separation module where a portion of the oxygen is extracted. The oxygen-enriched gas mixture can be disposed of into the atmosphere or, preferably, sent to a fuel-cell power plant that can generate electricity for the object needs. The product remaining after the oxygen extraction is an oxygen-depleted (hypoxic) gas mixture, containing 12% of oxygen and about 88% of nitrogen with traces of other atmospheric gases. The product is further compressed by compressor 14 and sent for storage into high pressure container 13, ready to be released, as the fire suppressant, into hose 12.

Suitable air-separation modules, compressors and containers are available from FirePASS Corporation and Hypoxico Inc. in New York. The working principle of these modules has been described in previous patent applications provided above.

Hypoxic generator station 15 can also employ nitrogen generators that extract 88% nitrogen from ambient air. Alternatively pure nitrogen extracted from ambient air can be mixed in desired proportions with ambient air and provide nitrogen-enriched air for storage in container 13. However, nitrogen extraction requires preliminary drying of processed air and is more costly and less efficient than hypoxic air generation.

Figure 2:
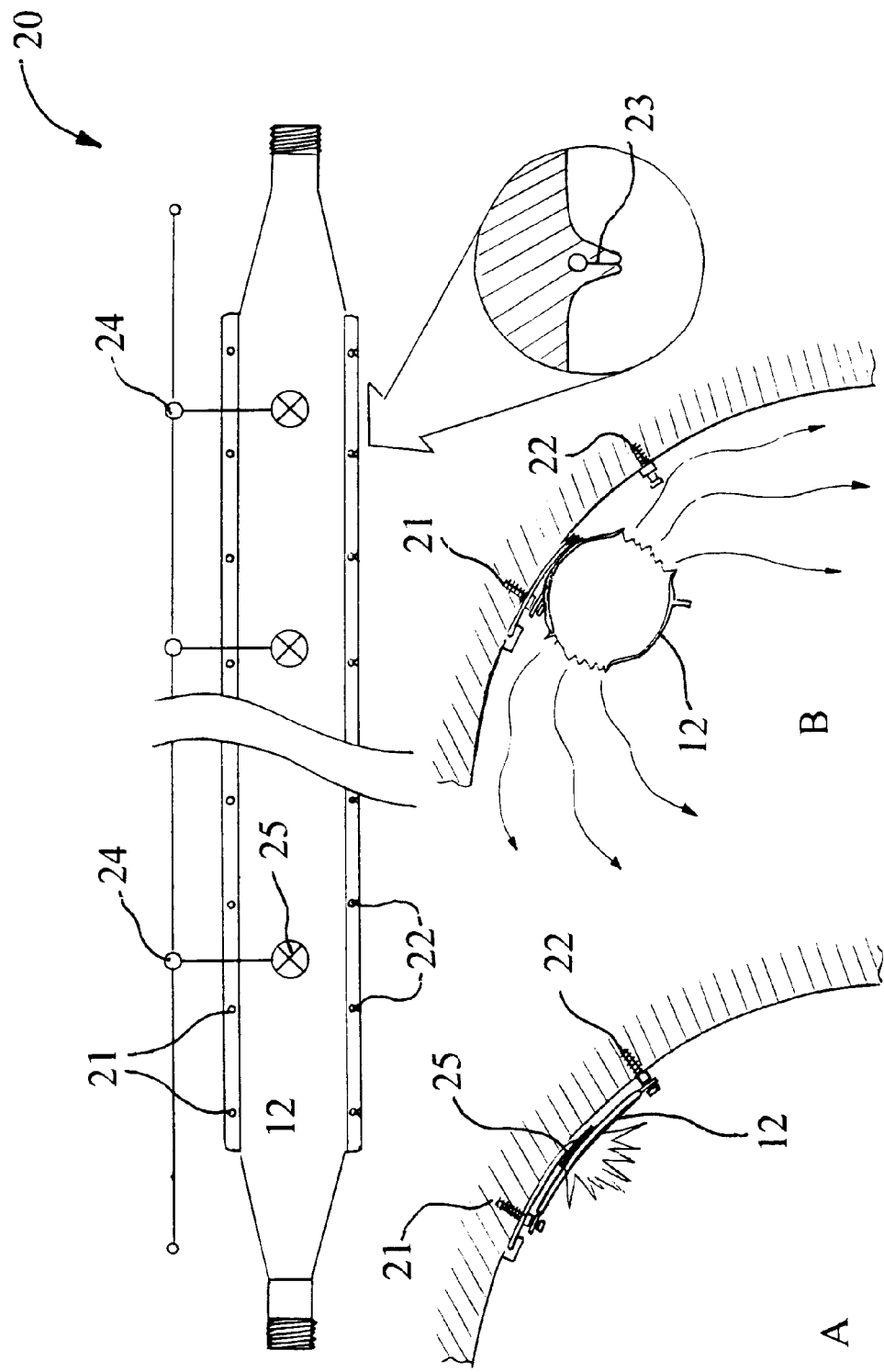
FIG. 2 shows schematically the design and working principle of the addressed gas delivery system.

FIG. 2 shows schematically the design and working principle of the addressed gas delivery system 20. The hose 12 is made of any length from a strong, thin synthetic or composite material and can be delivered for installation on a bobbin in collapsed form.

The upper rim of the hose 12 is permanently attached to a tunnel wall by screws 21. Screws 22 hold the lower rim so that the rim can be pulled out when hose 12 inflates. This can be achieved by prefabricating a special cut 23 that will allow the lower rim to slide out under screw 22 or by placing a holding bar or profile that will cover the lower rim and press it against the tunnel wall.

Multiple fire detectors 24 are installed at desired intervals (e.g. 20 meters) alongside the hose 12. Detectors 24 communicate with a central fire alarm and control station (55 on FIG. 5) and allow the precise determination of the location of fire.

Hose puncturing devices 25 are installed at desired intervals behind the hose 12 (between the hose and the wall of a tunnel). The devices 25 can be initiated by a signal transmitted from a detector 24 or from central station 55 and puncture the hose 12 at controlled location.

Most recommended are puncturing devices of two types:
electro-explosive
thermoelectric.

An electro-explosive device can be easily and cheaply made by putting a small amount of a plastic explosive in a flat metal can and wiring it directly to the nearest detector 24 and/or to the central alarm and control system 55. The metal can size can be very small (2–5 cm in diameter) but they can cause an extensive damage to the hose 12 at a desired location. A signal from a detector 24 or central station will initiate an explosion that will puncture or destroy a portion of hose 12.

A thermoelectric device can be made even cheaper from a piece of a wire from a nickel-chrome alloy as is used in most electric heaters and stoves. When electric current is applied, such piece of wire would heat up extensively and burn through the material of the hose 12 in a few seconds. Such devices can be preinstalled on an assembly line inside or outside of hose 12 jointly with the connecting electric wire or installed at site. The thermoelectric puncturing devices can be made in a shape of a ring—to provide a round hole, or in linear shape—to cut the hose 12 in two parts.

The working principle of the gas distribution system 20 can be explained as follows. When a fire is detected by the nearest detector 24, it sends a signal to the central control station 55 and initiates adjacent puncturing device 25 by applying electric current to an electro-explosive or thermo-electric device that punctures or tears apart hose 12 (FIG. 2A). In some cases device 25 can be initiated only by an operator from a central control station (e.g. in a railroad tunnel when a train on fire stops completely) when alarm from detector 24 is supported by visual information from one of video cameras installed throughout a tunnel. It is always advisable to install video cameras (not shown here) jointly with the system 20. After hose 12 is punctured, the whole fire-suppression system is initiated and the hypoxic fire suppressant is sent under pressure into hose 12. The lower rim becomes loose and the hose 12 inflates it to a tubular shape transmitting the breathable fire-suppressive composition at a high velocity to the punctured by device 25 hole and releasing it directly into location affected by fire. After each use, the destroyed portion of the hose 12 can be easily replaced with a new one and attached in place with glue, welding or other fastening method.

Metal piping certainly can be used instead of the lightweight hose 12, however it would require much more space and a lot of installation work, which many existing tunnels cannot allow. Moreover, metal piping would require installation of a large amount of gas release nozzles with gas release valves, actuators, initiators and complicated control network. All this will inflate the cost and diminish the reliability of the system significantly.

Figure 3:
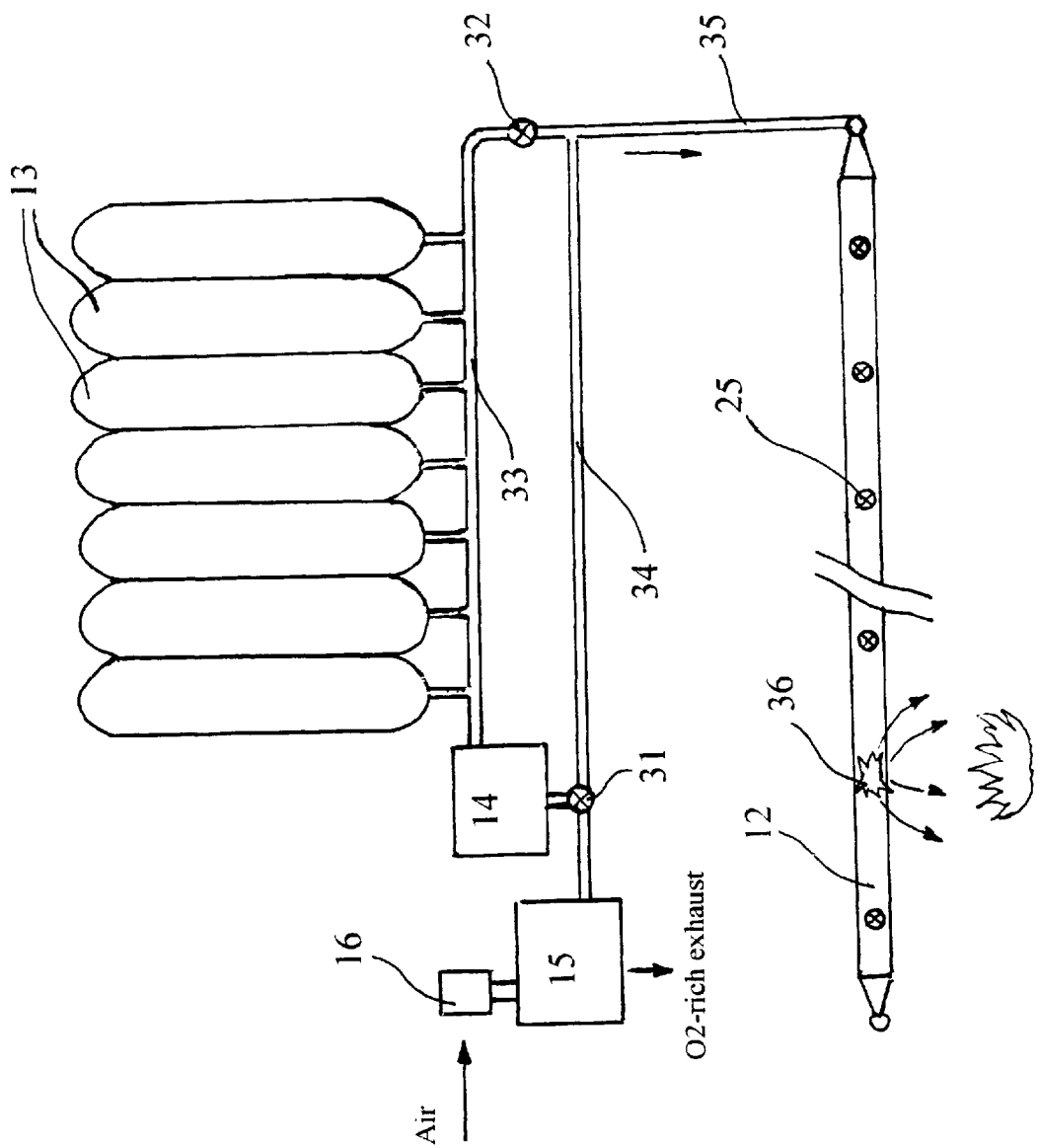
FIG. 3 shows schematically the working principle of the first embodiment.

FIG. 3 shows schematically the working principle of the embodiment 10. Hypoxic generator station 15 intakes ambient atmospheric air through intake filter 16 and separates it into oxygen-reduced (hypoxic) product and oxygen-enriched waste. The oxygen-enriched gas mixture can be disposed into the atmosphere or, preferably, send to a fuel-cell power plant that can generate electricity for the object needs. The product remaining after the oxygen extraction is breathable hypoxic air containing 12% of oxygen by volume and having a fire suppressive property. Therefore the product can be further also called a breathable fire suppression agent or fire suppressant.

Three-way valve 31 allows sending the product into high-pressure compressor 14 that, via line 33, refills containers 13 while release valve 32 is closed. Containers 13 store the product under high pressure (50–300 bar) in amounts sufficient to flood a desired portion of a tunnel: a segment of at least 50 meters is recommended for automobile tunnels and 100 meters for railroad tunnels (smaller segments may apply to mines and other structures). For instance, a railroad tunnel tube with 25 m2 section area would need 2500 m3 of the fire suppressant in order to flood a 100 m segment. In order to store 2500 m3 of suppressant at 100 bar pressure a storage volume of only 25 m3 is required (e.g. 25 containers at 1 m3 each).

When a fire in a tunnel is detected and the nearest device 25 punctures hole 36 in gas delivery hose 12, release valve 32 opens as a result of a signal from central control station and releases high-pressure suppressant via a pressure reducing device (not shown here), from high pressure line 33 into line 35 and hose 12. At this time hypoxic generator station 15 and compressor 14 start working providing more product into line 33. Hose 12 inflates and releases breathable fire suppressant through the hole 36, which allows flooding a segment of the tunnel and extinguishing any fire instantly, while providing entrapped people with fresh breathable hypoxic air. The suppressant, released from high pressure becomes very cold, which will provide an additional benefit of thermal absorption and create a positive pressure zone keeping normoxic air away from the flooded zone.

After all suppressant has been released, valve 31 opens line 34 and hypoxic generator 15 sends additional hypoxic composition directly into hose 12, via line 35. The recommended oxygen content in this freshly-made composition is 12%–14%, which will maintain a fire suppressive atmosphere while providing comfortable breathing conditions for people. The supplied flow must be sufficient to keep a positive pressure in the fire zone for as long as needed. In the previous case of a railroad tunnel, a flow of about 400 m3 per minute would be sufficient, provided that all traffic in the tunnel is stopped. This amount can be produced by five hypoxic generators, providing 40 m3/min each, that are available from FirePASS Corporation in New York, U.S.A.

Figure 4:
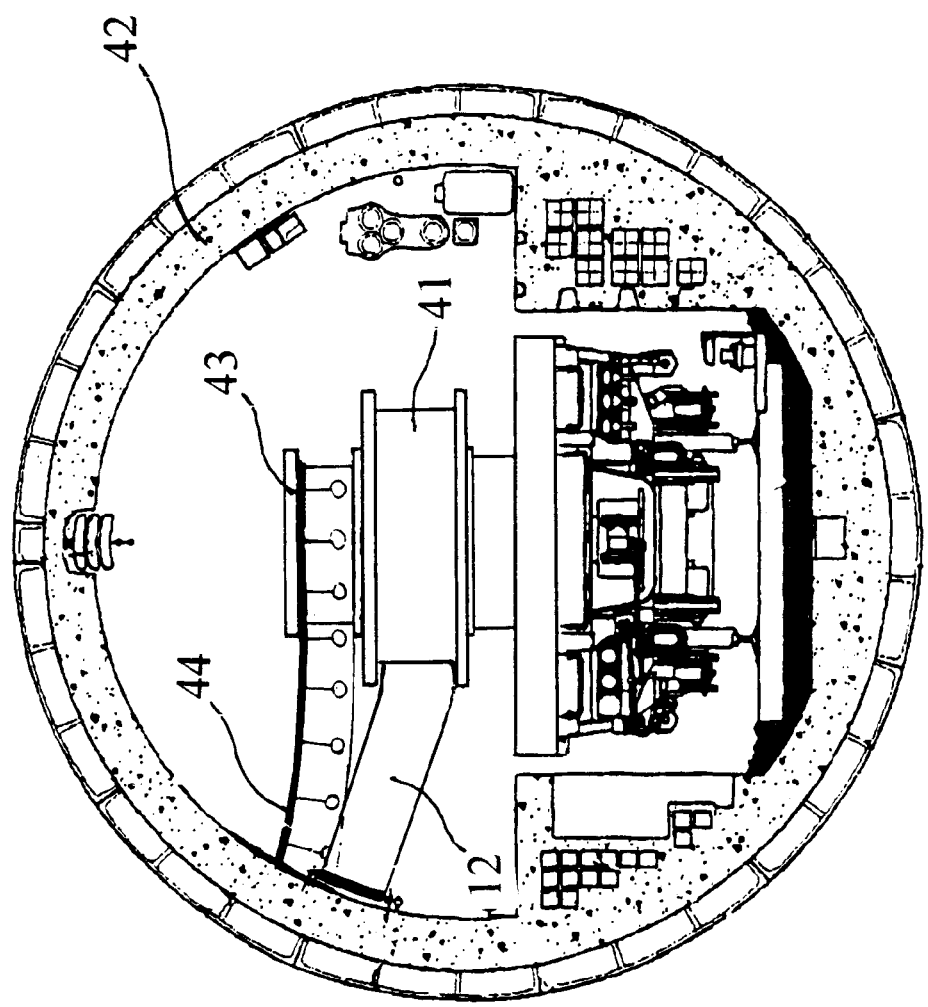
FIG. 4 illustrates the installation process of the gas-delivery hose inside an existing railroad tunnel tube.

FIG. 4 illustrates the convenience of the installation of the gas-delivery hose 12 inside an existing railroad tunnel tube. A bobbin 41 is mounted on a railroad platform slowly moving through the tube 42. Two workers can walk on the benchwall and attach hose 12 to the tube wall with screws or other fixtures. All necessary wiring, detectors 24 and devices 25 are incorporated in a plastic tape 44 that is attached to the wall prior to hose 12 or can be installed separately.

Figure 5:
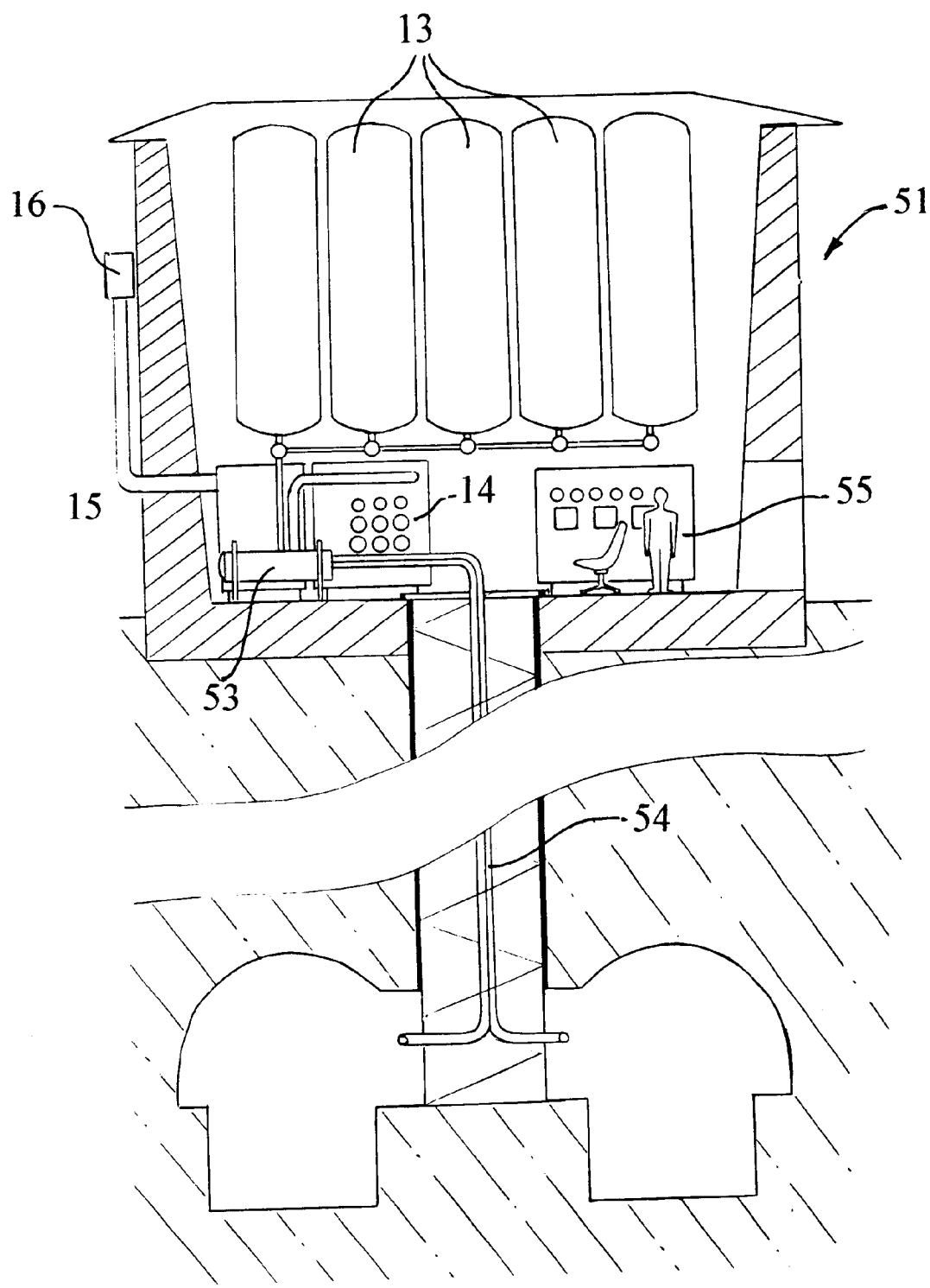
FIG. 5 shows an equipment-installation plan of the invented fire suppression system designed for an existing two-tube railroad tunnel.

FIG. 5 shows an equipment-installation plan of the invented fire suppression system designed for an existing two-tube railroad tunnel in New York, wherein most of the equipment is installed in a ventilation shaft building 51.

High-pressure gas containers 13 contain breathable hypoxic fire suppressive composition under 100 bar pressure ready to be released into pressure reducing device 53 and on of the pipes 54. When in operation, hypoxic generator 15 intakes ambient air though the intake filter 16 and sends hypoxic air, after partial oxygen extraction, into high-pressure compressor 14 that can refill containers 13 when needed. The system is controlled by central computerized control station 55 under constant supervision of an operator.

Figure 6:
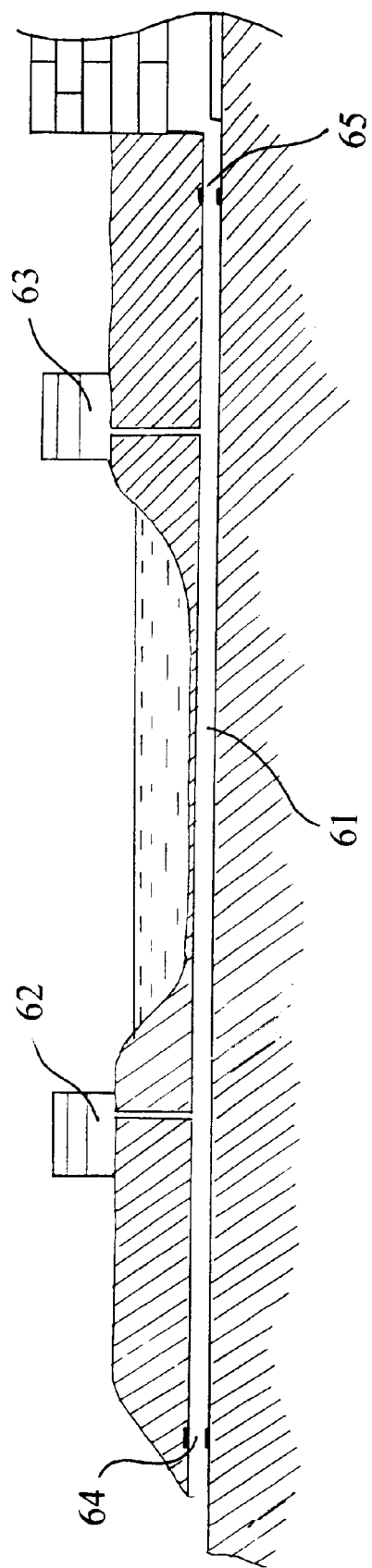
FIG. 6 shows an additional solution for the controlled delivery of the fire suppressant directly into a necessary section of a tunnel tube.

FIG. 6 shows an additional practical solution for controlled selective delivery of the fire suppressant into a required section of the same railroad tunnel tube 61 having two existing ventilation shaft buildings 62 and 63 equipped as shown on FIG. 5. This system can redirect the flow of the agent in the tunnel simply by plugging up air blocks 64 or 65. The blocks or plugs 64 and 65 can be made in a variety of configurations from light materials that can block air but not a train.

Figure 7:
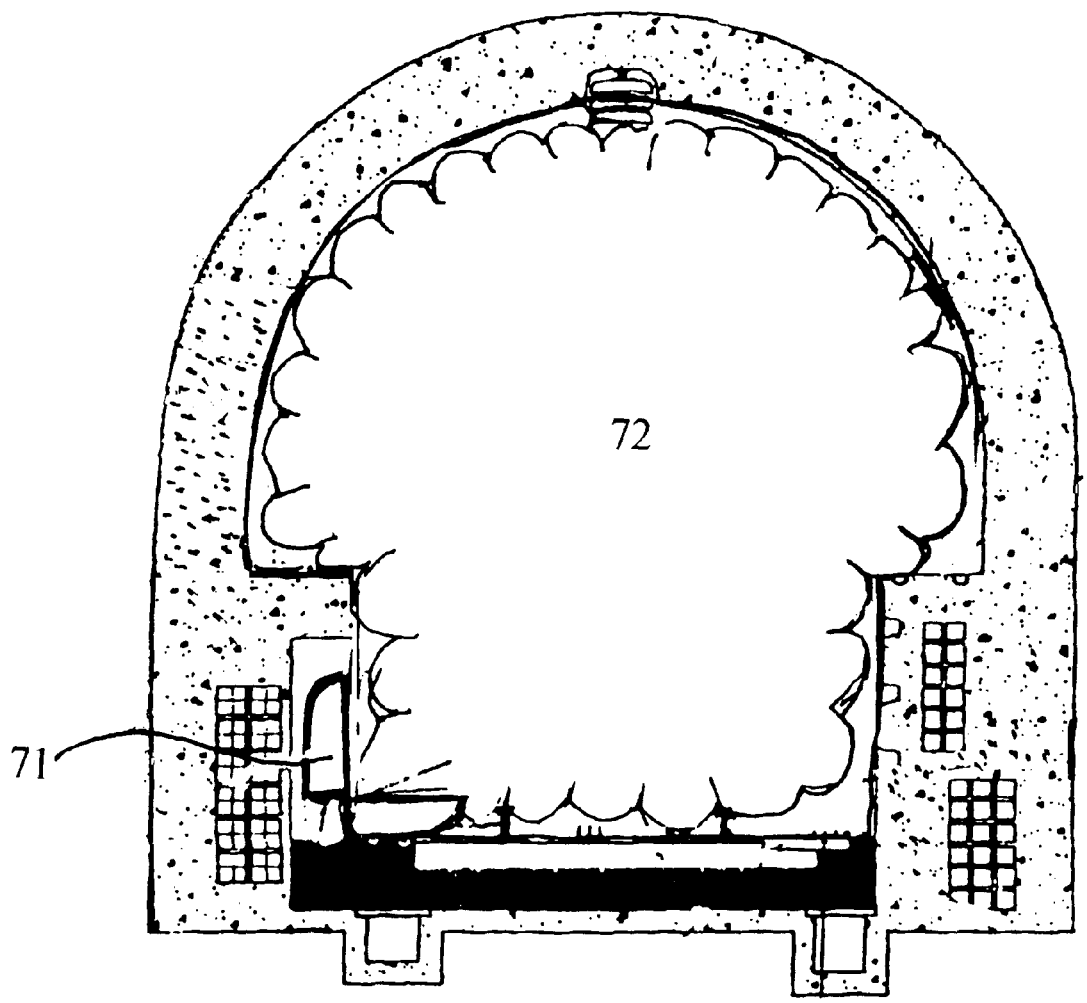
FIG. 7 shows the most effective design of a tube-blocking plug.

FIG. 7 shows the most effective design of plug 72 installed in a special box 71 placed at each end of the tunnel tube 61. Plug 72 that can be inflated in case of emergency, providing a complete blockage of the tunnel entrance. The inflatable plug 72 is made from a lightweight strong synthetic material and can be easily deflated by cutting through or removing a plug from it. The purpose of the inflatable tunnel plug 72 is simply to prevent air movement in order to control the direction of the agent flow, and it can in no way prevent a train from moving in or out. Plug 72 can be inflated using a device similar to one used in automobile bags or just from a small container with compressed air or nitrogen. Other pyrotechnical or chemical devices can provide for inflation as well. The inflation is initiated, when needed, by a signal from the central control station 55.

Figure 8:
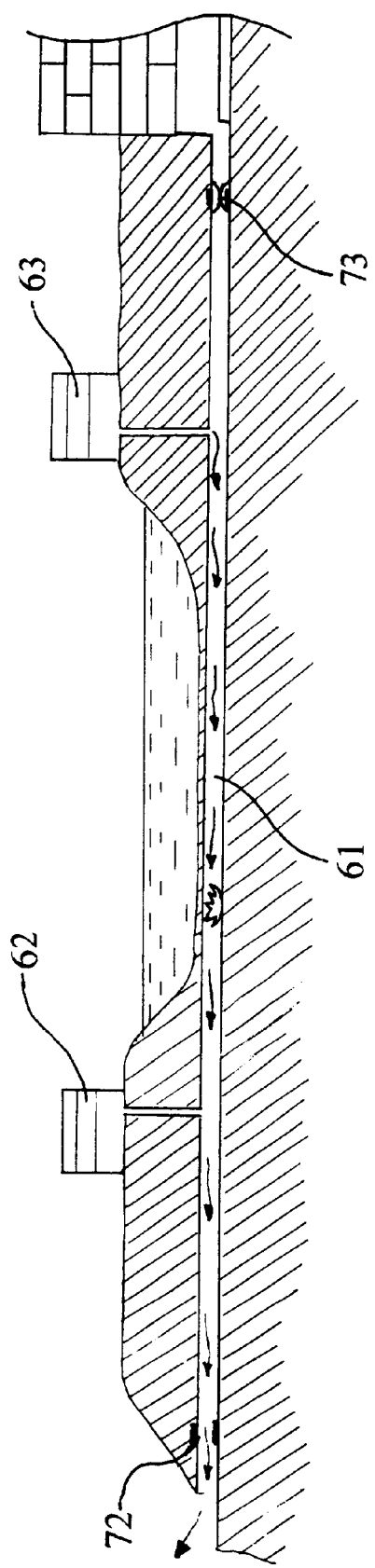
FIGS. 8, 9 and 10 illustrate the working principle of the gas-flow control system based solely on the inflation of plugs in different situations.
Figure 9:
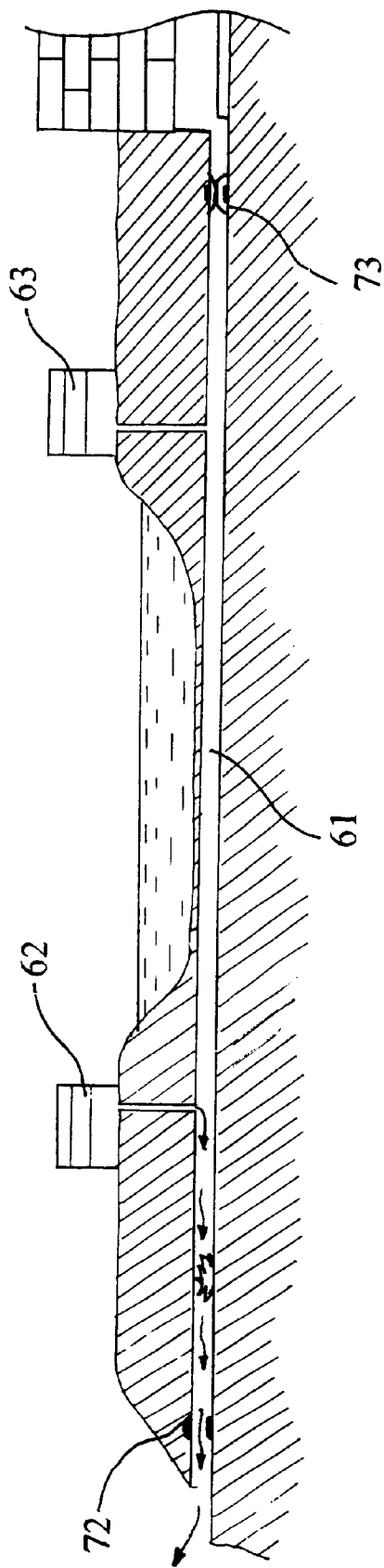
Figure 10:
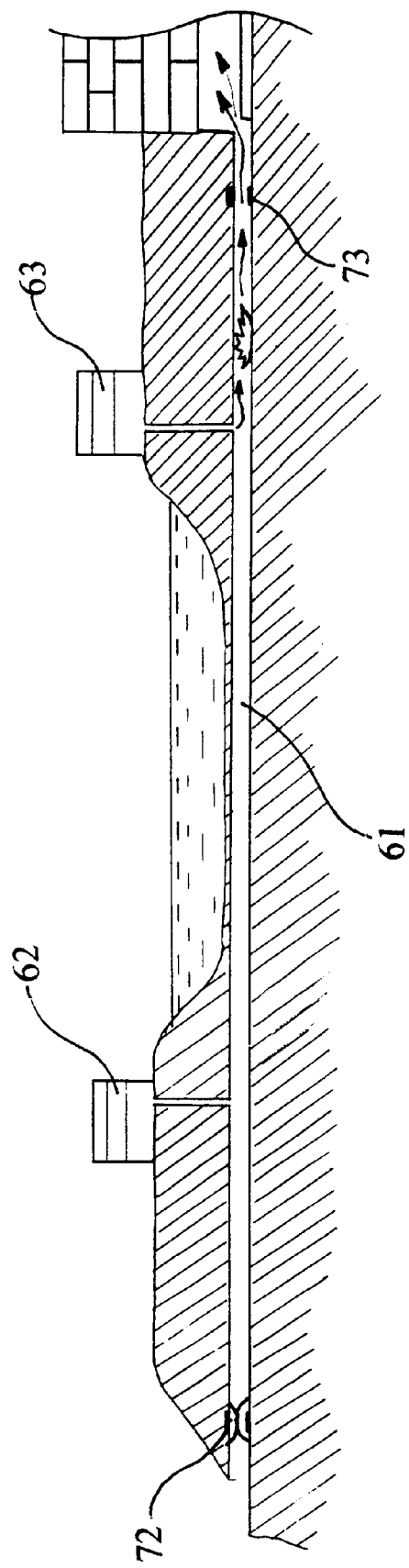

FIGS. 8, 9 and 10 illustrate the working principle of the gas flow control system based solely on the inflation of plugs 72 and 73 in different situations.

When a fire starts in a middle section of a tunnel as shown on FIG. 8, the suppressive agent is released from the gas storage containers in the station 63. The agent is directed to the fire site simply by inflating plug 73, via a signal from control unit 55. FIG. 9 shows a fire in the first section of the tube 61. In this case, the fire suppressant is released from the station 62 and plug 73 blocks the tube 61 in the final section, directing the agent flow into the fire-affected area. Fire becomes extinguished, smoke is removed from the tunnel and the area becomes ventilated with the fresh breathable gas mixture for as long as needed.

FIG. 10 illustrates similar situation with a fire in the last section of the tube 61. Plug 72 inflates and the fire suppressive agent is released from station 63, flooding the fire site instantly and providing breathable atmosphere for trapped people. It is recommended that a train with a fire on board stop completely in order to provide most efficient suppression.

FIG. 11 illustrates an alternative method wherein both plugs 72 and 73 can be closed while smoke and excessive suppressant sent from station 63 can be removed via a ventilation shaft in station 62.

Tunnel plugs can be used effectively in a combination with the addressed gas delivery system shown on FIG. 2. This will ensure that the fire suppressant flow could be redirected in the required direction if the situation changes. In longer tunnel tubes, multiple tunnel plugs can be installed in different sections of a tunnel in order to achieve faster fire extinguishing results and to use fire suppressant more effectively. Such a plug or a blocking device can be made as an inflatable, expandable, erectable, moveable or falling barrier that will substantially block air movement through it. An inflatable plug made of a lightweight synthetic material, a moveable or closeable gate or shield, a droppable curtain or other air-blocking means can be used as well. The plugs can be also rapidly inflated and deflated by a blower controlled by an operator at the control station according to a situation during a tunnel fire. This will make the system very reliable and easy to control.

What is claimed is:

1. A fire suppression system and a method for selective delivery of a breathable fire-suppressive gas directly to a fire location inside a transportation tunnel, said system and method comprising:

a gas generation device producing said fire-suppressive gas from ambient atmospheric air;

a gas storage station consisting of multiple high-pressure containers receiving said fire-suppressive gas from said gas generation device and storing it for immediate release when needed;

an addressed gas delivery hose communicating with said gas storage station and said gas generation device and, when in use, receiving said fire-suppressive gas from said station and/or device; said hose installed throughout a tunnel and having multiple gas discharge means located at required intervals from each other;

fire detecting and alarm system having multiple detectors installed throughout a tunnel at desired intervals and, in case of a fire, providing a corresponding signal to a central control station having a computerized processing and control equipment that allows to initiate said fire suppression system automatically or manually, by a dispatcher;

when a fire is detected inside a tunnel, the initiation of said fire suppression system follows by a release of said fire-suppressive gas from said storage unit into said addressed gas delivery hose and simultaneously, by a signal from the central control station, one of said gas discharge means opens at a location closest to the fire site allowing selective release of the fire-suppressive gas and flooding of a section of the tunnel affected by fire; at the same moment said gas generation device starts producing more fire-suppression gas and sending it into the gas delivery hose allowing to keep a fire-suppressive atmosphere inside the tunnel for as long as needed;

inflatable tunnel blocking devices or a plugs may be installed additionally in deflated form inside a tunnel tube, preferably near both exits, in order to provide a supplementary control over the direction of the gas flow inside the tunnel; such a tunnel plug, when inflated, is capable to block a tunnel tube and obstruct the air movement;

in order to direct the flow of the fire-suppressive gas in the required direction, a tunnel plug should be inflated on the side opposite to the desired flow direction.

2. The system and method according to claim 1 wherein said gas delivery hose is made from a light synthetic material strong enough to withhold a working pressure of the gas delivery; said hose can be delivered on a bobbin and installed throughout the whole length of a tunnel by attaching to a wall with fixtures that would allow the hose to inflate when in use.

3. The system and method according to claim 1 wherein said gas discharge means being a multiplicity of puncturing devices installed at desired intervals behind said gas delivery hose on a tunnel wall; each such device communicating with the central control system and, when a signal from it is received, the device closest to the detected fire site, penetrates or destroys a portion of the hose by initiating an electro-explosive or thermoelectric mechanism; each such mechanism can be installed in a combination with a local fire detector and may also communicate with it and receive the initiating signal from said local detector.

4. The system and method according to claim 1 wherein said breathable fire-suppressive gas being an oxygen-reduced (hypoxic) air having oxygen content below 14% and preferably in a range from 10%–12%.

5. The system and method according to claim 1 wherein said system and method being applicable to use in mines, buildings and other human-occupied environments.

6. The system and method according to claim 1 wherein said selective delivery of a breathable fire-suppressive gas directly to a fire location can be accomplished in shorter tunnels without said addressed gas delivery hose and only by using said inflatable plugs that will direct the gas injected into a tunnel tube into desired direction.

7. The system and method according to claim 1 wherein said tunnel blocking devices or plugs can be used in multiple quantities installed throughout a tunnel tube that will allow to instantly isolate a fire affected section for quicker and more effective fire extinguishing; such a blocking device can be made as an inflatable, expandable, erectable, movable or falling barrier that will substantially block air movement through it.

8. The system and method according to claim 7 wherein said plugs being inflated by a propellant or, alternatively, said plugs can be quickly inflated and deflated by a blower controlled by an operator.

9. The system and method according to claim 1 wherein said gas generation device producing said fire-suppressive gas by extracting a portion of oxygen from ambient air and transmitting oxygen-depleted air into said gas storage station.

10. The system and method according to claim 1 wherein
said gas generation device producing said fire-suppressive gas by extracting nitrogen from ambient air, and transmitting nitrogen-enriched air into said gas storage station.

11. A method and equipment for addressed delivery of a fire-suppression agent directly to a section of a tunnel tube or other elongated normally occupied space, said method and equipment comprising:
an equipment for preparing, storing and releasing said agent inside a tunnel;
a fire-detection and monitoring equipment communicating with a system control station and having local fire detectors installed in multiple positions throughout the tunnel;
a lightweight flexible hose attached to a tunnel wall so that, when in use, it will be able to inflate and to transmit the fire-suppression agent;
said hose communicating through a release valve with a set of high pressure containers holding the fire-suppression agent;
a hose-puncturing device installed in multiple positions throughout the tunnel so that, when in use, it can puncture, cut or destroy a part of said hose in order to provide a release opening for said agent;
when a fire is detected by a local fire detector, the closest hose-puncturing device is initiated providing for a gas release opening near the fire site;
said agent being released at a reduced pressure from high-pressure containers into said hose, inflating it and propelling towards the opening provided by said hose puncturing device at a location nearest to the fire site.

12. The method and equipment according to claim 11 wherein
said puncturing device being an electro-explosive device that is attached to or at the hose on a tunnel wall, or preinstalled inside the hose during its assembly; when a signal from the control station or the nearest fire detector is received, the device is initiated and explodes, creating a hole in the hose or destroying a portion of it.

13. The method and equipment according to claim 11 wherein
said puncturing device being a thermoelectric device that is attached to or at the hose on a tunnel wall, or can be preinstalled inside the hose during its assembly; when a signal from the control station or the nearest fire detector is received, the device is initiated and heats up, creating a hole in the hose or cutting through it.

14. A method and equipment for controlled propelling of a fire-suppressive gas flow in a tunnel into desired direction, said method comprising:
a tunnel or other enclosed elongated structure having an entrance and an exit open to the outside atmosphere;
an equipment for preparing and releasing said gas inside the tunnel or a desired section of it;
a tunnel blocking device that, when in use, can block a portion of a tunnel in order to prevent air movement through it;
said devise allows redirecting the fire-suppressant flow towards a direction
said device, when deployed at the entrance of the tunnel or its section, will propel the released gas towards the exit;
said device, when deployed at the exit from the tunnel or its section, will propel the released gas towards the entrance.

15. The method and equipment according to claim 14 wherein
said tunnel blocking device is selected from a group consisting of an inflatable plug made of a lightweight synthetic material, a moveable or closeable gate or shield, and erectable or falling barrier, a droppable curtain and other air-blocking means or a combination thereof.

16. The method and equipment according to claim 14 wherein
said device can be inflated and deflated when needed by a blower controlled by a system operator.

17. The method and equipment according to claim 14 wherein
said fire-suppressive gas being breathable hypoxic air having oxygen concentration in the range from 10% to 14% by volume.

* * * * *